US012601713B2

(12) United States Patent
    Choi

(10) Patent No.: US 12,601,713 B2
(45) Date of Patent: Apr. 14, 2026

(54) WIRE BONDING DEFECT DETECTION APPARATUS AND OPERATION METHOD THEREOF

(71) Applicant: LG ENERGY SOLUTION, LTD., Seoul (KR)

(72) Inventor: Jee Hoon Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 318 days.

(21) Appl. No.: 18/281,718

(22) PCT Filed: Aug. 24, 2022

(86) PCT No.: PCT/KR2022/012614
    § 371 (c)(1),
    (2) Date: Sep. 12, 2023

(87) PCT Pub. No.: WO2023/027490
    PCT Pub. Date: Mar. 2, 2023

(65) Prior Publication Data
    US 2024/0159713 A1 May 16, 2024

(30) Foreign Application Priority Data
    Aug. 25, 2021 (KR) ........................ 10-2021-0112586

(51) Int. Cl.
    *G01N 29/06* (2006.01)
    *B23K 20/10* (2006.01)
    *H01M 50/516* (2021.01)
(52) U.S. Cl.
    CPC ........... *G01N 29/069* (2013.01); *B23K 20/10* (2013.01); *H01M 50/516* (2021.01);
    (Continued)

(58) Field of Classification Search
    None
    See application file for complete search history.

(56) References Cited

U.S. PATENT DOCUMENTS

| | | | | |
|---|---|---|---|---|
| 9,966,584 B2 * | 5/2018 | Jan | ..................... | H01M 10/6567 |
| 10,637,110 B1 | 4/2020 | Tsai et al. | | |

(Continued)

FOREIGN PATENT DOCUMENTS

| | | |
|---|---|---|
| CN | 101241872 A | 8/2008 |
| CN | 106870957 A | 6/2017 |

(Continued)

OTHER PUBLICATIONS

Hou, et al., "Using neural networks and immune algorithms to find the optimal parameters for an IC wire bonding process", Expert Systems With Applications, Elsevier, 2008, vol. 34, No. 1, pp. 427-436.

(Continued)

*Primary Examiner* — Suman K Nath
(74) *Attorney, Agent, or Firm* — Morgan, Lewis & Bockius LLP

(57) ABSTRACT

An apparatus and method are disclosed for detecting a bonding defect occurring during an ultrasonic wire bonding process between a battery cell and a busbar connected to each other by ultrasonic wire bonding. A bonding parameter collector, coupled to an ultrasonic wire bonding machine, may collect ultrasonic bonding parameters continuously during the ultrasonic wire bonding process, machine learning training may be performed by a convolutional neural network, and a bonding defect may be detected based thereon.

17 Claims, 5 Drawing Sheets

(52) U.S. Cl.
CPC .................. *G01N 2291/023* (2013.01); *G01N 2291/0289* (2013.01); *G01N 2291/267* (2013.01)

(56) References Cited

U.S. PATENT DOCUMENTS

| | | | |
|---|---|---|---|
| 2010/0010780 | A1 | 1/2010 | Zhu |
| 2010/0280646 | A1 | 11/2010 | Hesse et al. |
| 2014/0255748 | A1 | 9/2014 | Jan et al. |
| 2018/0261823 | A1 | 9/2018 | Jan et al. |
| 2018/0275667 | A1 | 9/2018 | Liu et al. |
| 2020/0242753 | A1 | 7/2020 | Shibata et al. |
| 2020/0259154 | A1 | 8/2020 | Jan et al. |
| 2020/0394354 | A1 | 12/2020 | He et al. |
| 2021/0132154 | A1 | 5/2021 | Kasper et al. |
| 2021/0249739 | A1 | 8/2021 | Jan et al. |
| 2022/0138992 | A1 | 5/2022 | Wu et al. |
| 2022/0152725 | A1 | 5/2022 | Koo et al. |
| 2024/0006647 | A1 | 1/2024 | Jan et al. |

FOREIGN PATENT DOCUMENTS

| | | | |
|---|---|---|---|
| CN | 107894564 | A | 4/2018 |
| CN | 111047225 | A | 4/2020 |
| CN | 112232400 | A | 1/2021 |
| CN | 113111570 | A | 7/2021 |
| EP | 2973782 | B1 | 10/2019 |
| JP | 2019-185580 | A | 10/2019 |
| JP | 2020-123459 | A | 8/2020 |
| JP | 2021-018849 | A | 2/2021 |
| JP | 2021-070061 | A | 5/2021 |
| KR | 10-2010-0087214 | A | 8/2010 |
| KR | 10-1033416 | B1 | 5/2011 |
| KR | 10-2011-0108950 | A | 10/2011 |
| KR | 10-2015-0078086 | A | 7/2015 |
| KR | 10-2019-0081614 | A | 7/2019 |
| KR | 10-2009572 | B1 | 8/2019 |
| KR | 10-2020-0080380 | A | 7/2020 |
| KR | 10-2021-0006075 | A | 1/2021 |
| KR | 10-2021-0014482 | A | 2/2021 |
| WO | 2021/008275 | A1 | 1/2021 |

OTHER PUBLICATIONS

Yan, et al., "A Deep Learning-Based Ultrasonic Pattern Recognition Method for Inspecting Girth Weld Cracking of Gas Pipeline", IEEE Sensors Journal, IEEE Sensor Council, 2020, vol. 20, No. 14, pp. 7997-8006.

Barcelo, et al., "Development of an ultrasonic weld inspection system based on image processing and neural networks", Nondestructive Testing and Evaluation, 2017, vol. 33, No. 2, pp. 229-236.

Selim, et al., "Wavelet Transform Applied to Internal Defect Detection by Means of Laser Ultrasound", Wavelet Transform and Complexity, 2019, 17 pages.

Ogawa, et al., "Identification of normal and abnormal from ultrasound images of power devices using VGG16", 2020 20th International Conference on Control, Automation and Systems (ICCAS 2020), 2020, pp. 415-418.

The extended European search report issued in corresponding EP Patent Application No. 22861699.1 dated Oct. 9, 2024.

Long et al., "Joint Feature Classification for Wire Bond Joint Based on KPCA and Random Forest", IEEE Xplore, 2018 20th Electronics Packaging Technology Conference, pp. 753-757.

International Search Report (with partial translation) dated Nov. 22, 2022 with Written Opinion issued in corresponding Korean Patent Application No. PCT/KR2022/012614.

Office Action issued in corresponding Korean Patent Application No. 10-2021-0112586, dated Jun. 17, 2025. (Note: JP 2021-018849 A, KR 10-2020-0080380 A were previously cited).

Dzakmic, et al., "Combined Fourier Transform and Mexican Hat Wavelet for Fault Detection in Distribution Networks.", 9th IEEE-GCC Conference and Exhibition (GCCCE), 2017, 6 pages.

Y. Yan et al., "A Deep Learning-Based Ultrasonic Pattern Recognition Method for Inspecting Girth Weld Cracking of Gas Pipeline", IEEE Sensors Journal, Jul. 15, 2020, 7997p-8006p.

Tao Wang et al. "Automatic ECG Classification Using Continuous Wavelet Transform and Convolutional Neural Network," Entropy, Jan. 18, 2021, 1p-13p.

Office Action dated Dec. 20, 2025 issued in CN Patent Application No. 202280021280.7. (Note: KR 10-1033416 B1 already submitted.).

* cited by examiner

【FIG. 1】
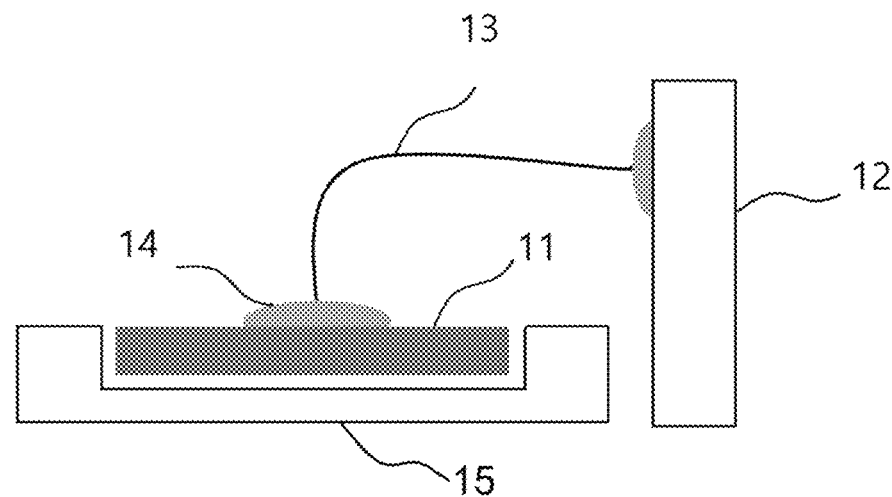
【FIG. 2】
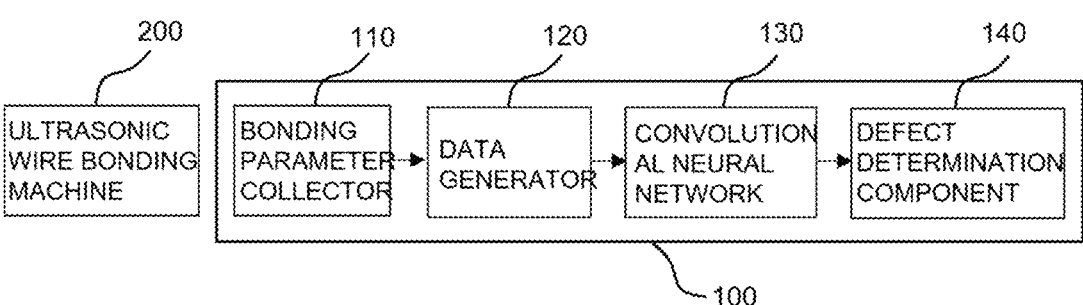

| Record Type | ... | t20 | t21 | t22 | t23 | t24 | t25 | t26 | t27 | t28 | t29 |
|---|---|---|---|---|---|---|---|---|---|---|---|
| 1 | U/S | ... | 591.00 | 591.50 | 591.00 | 591.00 | 591.00 | 591.00 | 591.00 | 591.00 | 591.00 | 591.00 |
| 2 | OHM | ... | -107.40 | -107.30 | -107.60 | -107.40 | -107.60 | -108.60 | -108.50 | -108.60 | -108.60 | -109.00 |
| 3 | VOLT | ... | 56.00 | 56.00 | 56.00 | 56.00 | 56.00 | 56.00 | 56.00 | 56.00 | 56.00 | 56.00 |
| 4 | OHM | ... | 450.00 | 450.00 | 450.00 | 450.00 | 450.00 | 450.00 | 450.00 | 450.00 | 450.00 | 450.00 |
| 5 | PHAS | ... | 0.00 | 0.00 | 0.00 | 0.00 | 0.00 | 0.00 | 0.00 | -0.46 | -0.46 | 0.00 |
| 6 | FREQ | ... | 7773 | 7773 | 7774 | 7774 | 7775 | 7775 | 7776 | 7774 | 7776 | 7776 |

310

```
cwt=[]
for k in dates:
 for j in k.['Wire Number'].unique():
   b=np.array(k[k['Wire Number']==j].iloc[:,2:])
   c2=torch.tensor(pywt.cwt(np.array(MinMaxScaler().fit_transform(b)), 2, 'mexh')[0][0]
   c3=torch.tensor(pywt.cwt(np.array(MinMaxScaler().fit_transform(b)), 3, 'mexh')[0][0]
   c4=torch.tensor(pywt.cwt(np.array(MinMaxScaler().fit_transform(b)), 4, 'mexh')[0][0]
   c5=torch.tensor(pywt.cwt(np.array(MinMaxScaler().fit_transform(b)), 5, 'mexh')[0][0]
   c6=torch.tensor(pywt.cwt(np.array(MinMaxScaler().fit_transform(b)), 6, 'mexh')[0][0]
   c7=torch.tensor(pywt.cwt(np.array(MinMaxScaler().fit_transform(b)), 7, 'mexh')[0][0]
   c8=torch.tensor(pywt.cwt(np.array(MinMaxScaler().fit_transform(b)), 8, 'mexh')[0][0]
   c9=torch.tensor(pywt.cwt(np.array(MinMaxScaler().fit_transform(b)), 9, 'mexh')[0][0]
   c10=torch.tensor(pywt.cwt(np.array(MinMaxScaler().fit_transform(b)), 10, 'mexh')[0][0]
   c11=torch.tensor(pywt.cwt(np.array(MinMaxScaler().fit_transform(b)), 11, 'mexh')[0][0]
   c12=torch.tensor(pywt.cwt(np.array(MinMaxScaler().fit_transform(b)), 12, 'mexh')[0][0]
   c13=torch.tensor(pywt.cwt(np.array(MinMaxScaler().fit_transform(b)), 13, 'mexh')[0][0]
   c14=torch.tensor(pywt.cwt(np.array(MinMaxScaler().fit_transform(b)), 14, 'mexh')[0][0]
   cwt.append(torch.stack([c2[:3],c3[:3],c4[:3],c5[:3],c6[:3],c7[:3],c8[:3],c9[:3],c10[:3],c11[:3],c12[:3],c13[:3],c14[:3]]).view([-1]))
   cwt.append(torch.stack([c2[3:],c3[3:],c4[3:],c5[3:],c6[3:],c7[3:],c8[3:],c9[3:],c10[3:],c11[3:],c12[3:],c13[3:],c14[3:]]).view([-1]))
```

[FIG. 4]
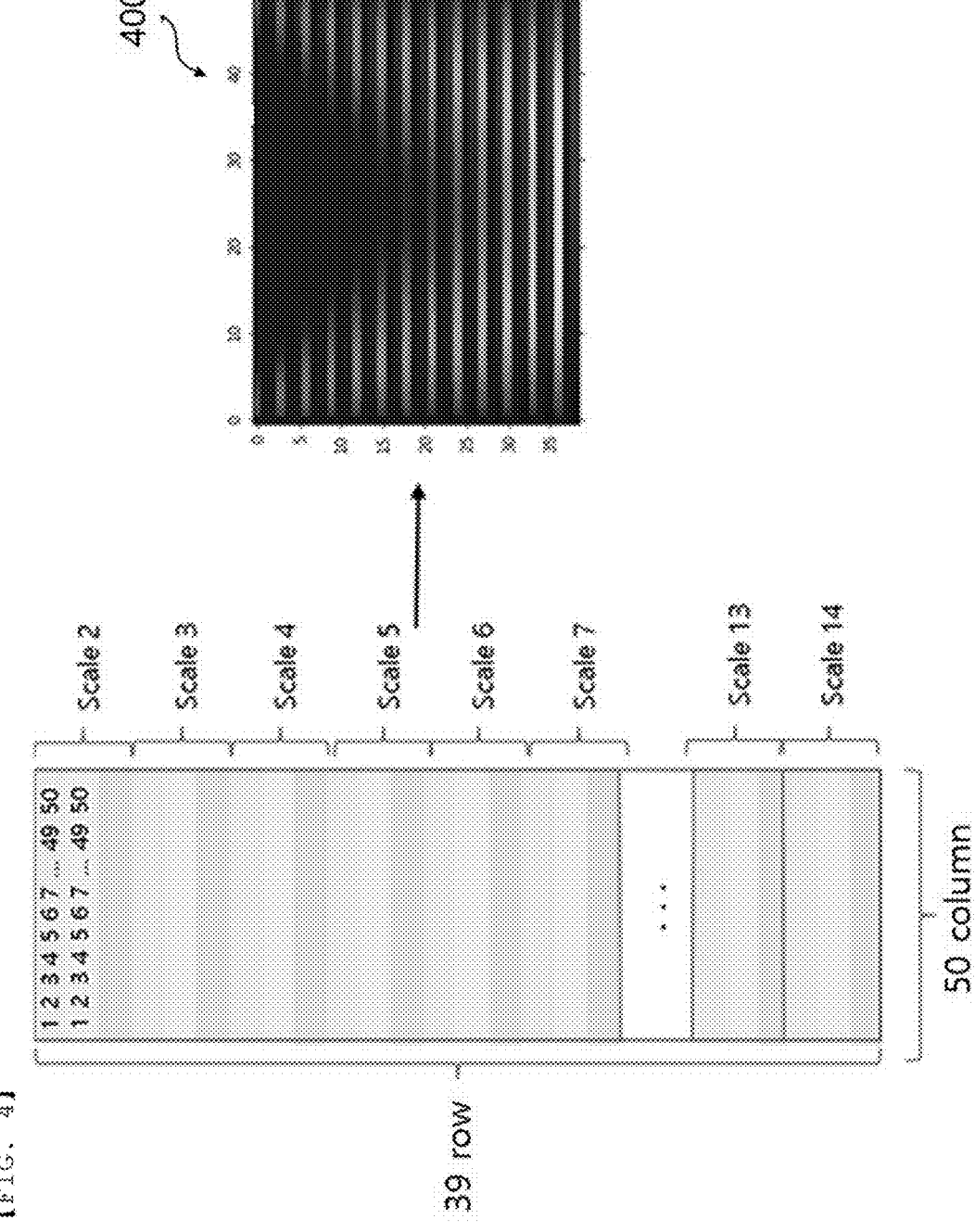

[FIG. 5]
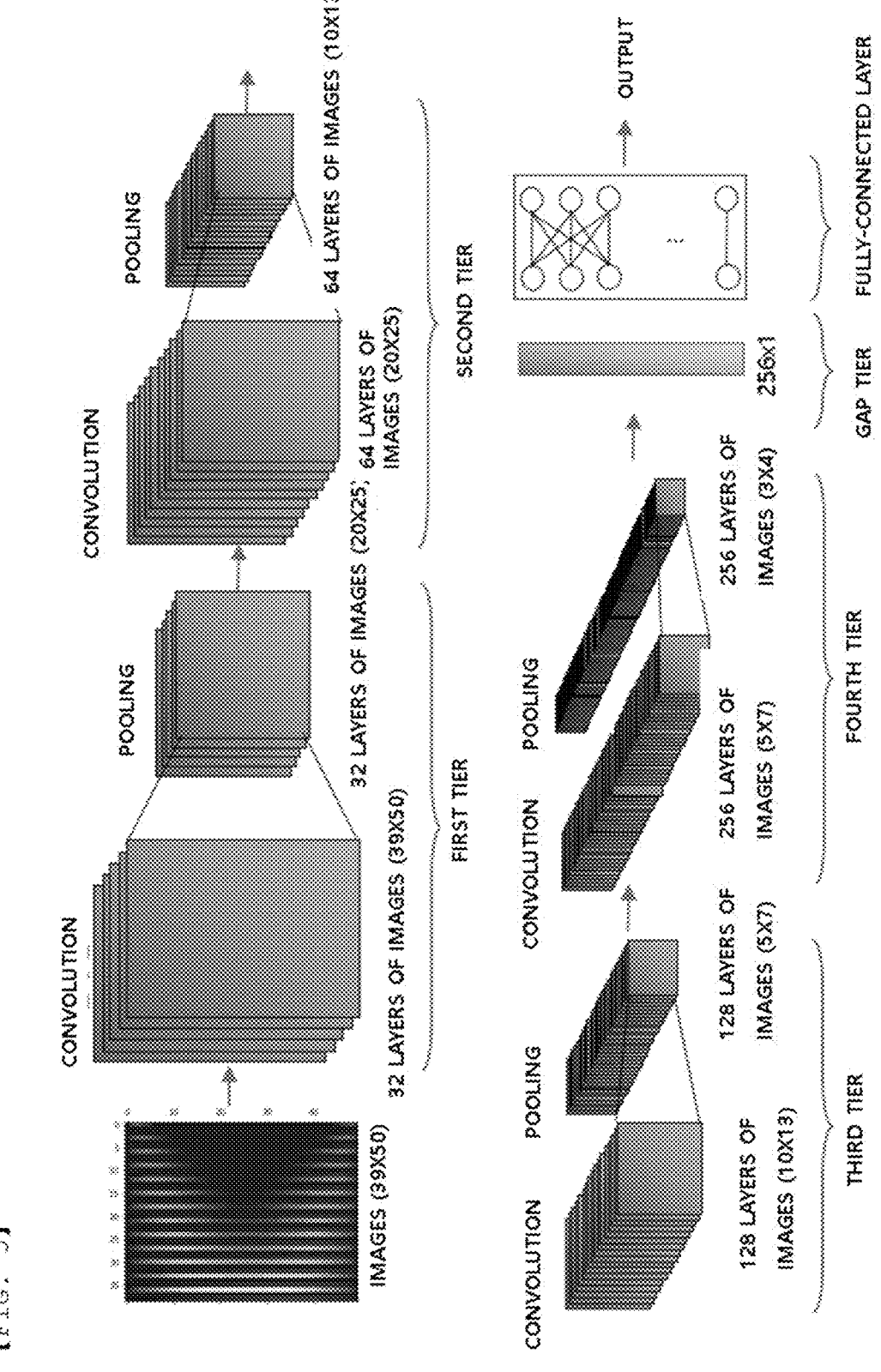

FIG. 6

```
CNN(
  (layer1): Sequential(
    (0): Conv2d(1, 32, kernel_size=(3, 3), stride=(1, 1), padding=(1, 1))
    (1): LeakyReLU(negative_slope=0.01)
    (2): MaxPool2d(kernel_size=(2, 2), stride=(2, 2), padding=0, dilation=1, ceil_mode=False)
  )
  (layer2): Sequential(
    (0): Conv2d(32, 64, kernel_size=(3, 3), stride=(1, 1), padding=(1, 1))
    (1): LeakyReLU(negative_slope=0.01)
    (2): MaxPool2d(kernel_size=(3, 3), stride=2, padding=1, dilation=1, ceil_mode=False)
  )
  (layer3): Sequential(
    (0): Conv2d(64, 128, kernel_size=(3, 3), stride=(1, 1), padding=(1, 1))
    (1): LeakyReLU(negative_slope=0.01)
    (2): MaxPool2d(kernel_size=(3, 3), stride=2, padding=1, dilation=1, ceil_mode=False)
  )
  (layer4): Sequential(
    (0): Conv2d(128, 256, kernel_size=(3, 3), stride=(1, 1), padding=(1, 1))
    (1): LeakyReLU(negative_slope=0.01)
    (2): MaxPool2d(kernel_size=(3, 3), stride=2, padding=1, dilation=1, ceil_mode=False)
  )
  (avgpool): AvgPool2d(kernel_size=3, stride=3, padding=0)
  (fc): Linear(in_features=256, out_features=4, bias=True)
)
```

WIRE BONDING DEFECT DETECTION APPARATUS AND OPERATION METHOD THEREOF

TECHNICAL FIELD

This application claims the benefit of priority to Korean Patent Application No. 2021-0112586 filed on Aug. 25, 2021, the disclosure of which is incorporated herein by reference in its entirety.

The present invention relates to an apparatus and method for detecting various defects occurring during a wire bonding process. More particularly, the present invention relates to an apparatus and method for detecting a defect occurring during an ultrasonic wire bonding process through sampling of bonding parameters generated during the wire bonding process and machine learning of a convolutional neural network (CNN), which is a kind of deep-learning-based learning algorithm.

BACKGROUND ART

There are manual macrography that checks all wires by physically pulling or picking the same and an automated inspection method using image processing as current wire bonding inspection methods performed at the time of manufacture of a cylindrical pack to which wire bonding is applied.

These inspection methods involve problems in that the methods are inefficient as the size of the pack is increased and it is difficult to secure reliability due to physical damage, the position of a camera, resolution, and a change in surrounding environment, such as lighting.

In addition, when separate equipment for additional electrical inspection or mechanical inspection is utilized during a bonding process, other physical and electrical damage is concerned and separate cost and time are additionally required during an inspection process, although there are advantages in terms of a wire defect, a solder defect, wire height, and the distance between adjacent wires.

If all possible bonding parameters that may affect quality at the time of wire bonding are collected and analyzed in real time in order to perform highly reliable non-destructive inspection, therefore, it may be possible to accurately inspect errors in process and quality without physical damage.

Korean Patent Application Publication No. 2019-0081614 relates to a system that inspects welding quality of a weld portion using ultrasonic waves, wherein technology of radiating ultrasonic waves and machine-learning returned echo ultrasonic waves as an input is disclosed. However, a parameter in a bonding step is not used as an input, which is applied in the present invention, and a neural network is merely adopted for machine learning.

Japanese Patent Application Publication No. 2019-185580 discloses a method of detecting abnormality occurring in production facilities of a factory using a convolutional neural network; however, this publication is different from the present invention in terms of a substantial implementation method or an applicable target.

PRIOR ART DOCUMENTS (Patent Document 1) Korean Patent Application Publication No. 2019-0081614

(Patent Document 2) Japanese Patent Application Publication No. 2019-185580

DISCLOSURE

Technical Problem

The present invention has been made in view of the above problems, and it is an object of the present invention to provide an apparatus and method for detecting a defect through non-destructive inspection using sampling of direct parameters that may affect wire bonding and machine learning.

Technical Solution

A wire bonding defect detection apparatus according to the present invention to accomplish the above objects includes an input data collector configured to continuously collect a plurality of ultrasonic bonding parameters by hour (e.g., at least every hour) and to perform sampling, a data generator configured to apply wavelet transform to the collected data so as to be converted into images having a two-dimensional array, a convolutional neural network configured to machine-learning training data generated by the data generator, and a defect determination component configured to determine a defect due to the ultrasonic welding using the trained convolutional neural network.

In another aspect of an embodiment, a wire bonding defect detection method according to the present invention includes an input data collection step of continuously collecting a plurality of ultrasonic bonding parameters by hour and performing sampling; a training data generation step of converting the collected data into images having a two-dimensional array through wavelet transform; a step of training a convolutional neural network with the generated training data; and a defect determination step of determining a defect due to the ultrasonic bonding using the convolutional neural network.

Advantageous Effects

As is apparent from the above description, an apparatus capable of detecting a defect due to ultrasonic wire bonding according to the present invention and a method using the same have an effect in that bonding parameters that may affect quality of wire bonding are extracted and a defect possibility is calculated through machine learning thereof, whereby it is possible to improve efficiency due to non-destructive inspection and quality of a battery pack.

DESCRIPTION OF THE DRAWINGS

FIG. 1 is a view showing a basic structure in which a battery cell and a busbar are connected to each other by wire bonding.

FIG. 2 is a view schematically showing the construction of a wire bonding defect detection apparatus according to an embodiment of the present invention.

FIG. 3 is a view showing CWT calculation using the PyTorch API and parameter values that may be detected during a wire bonding process according to an embodiment of the present invention.

FIG. 4 is a view showing image data having an array of 50×39 as the result of CWT calculation according to an embodiment of the present invention.

FIG. 5 is a view showing a basic structure of a convolutional neural network according to an embodiment of the present invention.

FIG. 6 is a view showing an embodiment of a convolutional neural network using the PyTorch API according to an embodiment of the present invention.

MODES OF PRACTICE

Now, preferred embodiments of the present invention will be described in detail with reference to the accompanying drawings such that the preferred embodiments of the present invention can be easily implemented by a person having ordinary skill in the art to which the present invention pertains.

In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations.

When one part is said to be connected to another part throughout the specification, not only may the one part be directly connected to the other part, but also, the one part may be indirectly connected to the other part via a further part.

In addition, that a certain element is included does not mean that other elements are excluded, but means that such elements may be further included unless mentioned otherwise.

Hereinafter, the present invention will be described in more detail.

FIG. 1 is a view showing a basic structure in which an electrode 11 of a battery cell 15 and a busbar 12 are connected to each other by wire bonding, wherein the electrode 11 of the battery cell 15 and the busbar 12 are connected to each other via an aluminum wire 13 by ultrasonic welding.

During this process, most quality defects occur at a bonding spot 14, which is a weld region to which the wire is connected.

In general, wire bonding is technology of bonding two pads spaced apart from each other to each other using a metal wire, wherein a thermal compression method, in which heat is applied for compression, and an ultrasonic welding method, in which ultrasonic waves are applied for adhesion instead of heat, are mainly used.

The thermal compression method is a method in which the temperature of a bonding pad is increased to about 200° C. in advance, the temperature of a tip of a capillary is also increased to make a wire in the form of a ball, and the wire is attached while pressure is applied to the bonding pad through the capillary.

The ultrasonic welding method, which is a method in which ultrasonic waves are applied to a wedge (which is a wire moving mechanism similar to the capillary and forms no ball) while a wire is taken down onto a pad to attach the wire to the pad, has an advantage in that cost is low in terms of process and material. Since ultrasonic waves are used instead of heat and pressure, however, the ultrasonic welding method has a disadvantage in that tensile strength after adhesion (strength withstood when the wire is pulled after wire connection) is low although handling is easy.

In particular, since a problem that occurs due to adoption of the ultrasonic method directly leads to a product defect, accurate detection of a defect in real time is required above all in order to secure reliability of the product.

In addition, a parameter value necessary for ultrasonic injection may vary depending on a wire material (e.g. gold, aluminum, or copper), and defect condition may be differently set every time, which is troublesome.

The present invention is characterized in that, during a process in which ultrasonic welding is performed to electrically connect an electrode of a battery cell and a busbar to each other via an aluminum wire, a welding defect is determined through an electrical signal applied to a bonding spot, which is a weld region, and frequency characteristic information.

FIG. 2 is a view schematically showing the construction of a wire bonding defect detection apparatus, wherein the defect detection apparatus 100 is characterized by including a bonding parameter collector 110 configured to receive a quality measurement value from a means, such as an ultrasonic wire bonding machine 200, a data generator 120 for machine learning, a convolutional neural network 130 configured to perform deep-learning-based learning, and a defect determination component 140 configured to determine whether a defect has occurred based on the learned result.

The bonding parameter collector 110 functions to sequentially receive current and voltage of an ultrasonic generator and a wire deformation measurement value according to measurement time.

The data generator 120 samples data received from the bonding parameter collector 110 and uses a time/frequency transformation function so as to be utilized by the convolutional neural network 130 useful for image identification.

The convolutional neural network 130 is a module that constitutes a deep learning algorithm that learns two-dimensional array data as an input.

The defect determination component 140 functions to analyze the final result after test data are applied to the trained convolutional neural network 130, thereby determining whether a defect has occurred, and may provide the result of "yes/no" determining whether a defect has occurred or perform classification into groups designating the type or form of a defect; however, the present invention is not limited thereto.

In addition, there are ultrasonic generator current, ultrasonic generator voltage, wire deformation (a measured value of the height of an aluminum wire changed as the aluminum wire is melted), an ultrasonic frequency, setting voltage, and an ultrasonic phase difference as parameters that influence the wire bonding process.

In the present invention, three thereof, i.e., the ultrasonic generator current, the ultrasonic generator voltage, and the wire deformation, are set to bonding parameters for quality measurement, and signal information, such as phase information, the ultrasonic frequency, a resonance frequency, and pressure, may be used as needed; however, the present invention is not limited thereto.

The ultrasonic bonding parameters may be collected for a time of 10 ms to 1000 ms, preferably 50 ms to 500 ms, more preferably 100 ms to 150 ms. If the time deviates from the above range, it is not possible to secure effective parameters.

The collection time interval of the ultrasonic bonding parameters may be 0.1 ms to 100 ms, preferably 0.5 ms to 50 ms, more preferably 1 ms to 5 ms. If the collection time interval deviates from the above range, it is not possible to secure effective parameters.

In an embodiment of the present invention, 130 values are collected at intervals of 1 ms for 130 ms as input data, which are the ultrasonic bonding parameters. Thereamong, 50 data may preferably be sampled. If more than 50 data are sampled, there is a problem in that there is no advantage in the aspect of performance and learning time exponentially increases.

In the sampling method, arbitrary selection is performed or only data for initial 50 ms are extracted, arranged, and are converted into a value $x_{new}$ from 0 to 1 through the following equation, which is minimum-maximum (MinMax) scaling.

$$x_{new} = \frac{x - x_{min}}{x_{max} - x_{min}}$$

Continuous wavelet transform (CWT) is performed to reconstruct the converted value $x_{new}$ in the time domain.

In the present invention, CWT performs overlapping with an original signal using Mexican Hat, which is a waveform transform function, and generates 13 two-dimensional images while changing a scale value, which is one of wavelet parameters, to 2 to 14. The scale values are not limited to 13 and various changes may be performed as needed. In addition, a Bump, Morlet, or Paul function may be used as the waveform transform function, in addition to the Mexican Hat function.

FIG. 3 is a view illustrating a bonding parameter 300 received from a bonding parameter collector 110 according to an embodiment of the present invention, wherein an embodiment 310 in which the CWT calculation is substantially performed using the PyTorch API is briefly shown.

FIG. 4 is a view showing image data 400 having a two-dimensional array of 50×39 as the result of CWT calculation according to an embodiment of the present invention, wherein the image data 400 having the two-dimensional array are applied to a convolutional neural network as basic training data for machine learning.

In the present invention, analysis through CWT is an analysis method mainly used for failure diagnosis, which has a merit in finding discontinuity of a signal, which cannot be seen in Fourier transform, and is advantageous to analysis of an impulse signal having a large amplitude for an extremely short time.

A neural-network-based learning algorithm adopted in the present invention adopts a deep learning model having a neural network having a multilayer structure including an input layer, a hidden layer, and an output layer, and a convolutional neural network used when spatial shape information of image data is dealt with is mainly used thereamong.

A basic model of a general CNN is characterized by including a convolution layer configured to extract a local feature by calculating various convolutions using a filter with respect to an image, a pooling layer configured to perform a down-sampling function to reduce data size while maintaining spatial information, and a fully-connected multilayer neural network for final classification.

The convolutional neural network in the present invention is capable of minimizing the size of a learning parameter, compared to a general multilayer neural network. As a result, it is possible to reduce the scale of the fully-connected multilayer neural network, whereby design in a structure in which learning is possible within a short time is possible. In addition, it is possible to better extract a feature from ultrasonic welding than a direct numerical value.

FIG. 5 is a view showing the structure of a convolutional neural network that is implemented in the present invention.

As can be seen from FIG. 5, the convolutional neural network may be generally constituted by a convolution tier, a GAP tier, and a fully-connected tier (also referred to as an affine tier), and the convolution tier may be designed so as to have four tiers.

The convolution tier is constituted by four tiers, and different numbers of filters, i.e. 32, 64, 128, and 256 filters, are applied to the respective tiers.

In the convolution tier, a filter having a size of 3×3 in a two-dimensional array is used, and a stride, which is a filter movement interval, is set to 1. In addition, a padding value necessary to adjust the size of an output is also set to 1 in order to output an image having the same size as an input image.

In addition, each cell value is changed through the following equation, Leaky ReLU (rectified linear unit), which is an activation function.

$$f(x) = \max(0.01\,x,\,x) = \begin{cases} x & \text{if } x \geq 0 \\ 0.01\,x & \text{if } x < 0 \end{cases}$$

The image changed by the above activation function halves the size of the image through pooling calculation.

In the present invention, a maximum pooling (Max Pooling) technique, which extracts the largest value in an area set to a 2×2 filter size as a representative value, is used for pooling calculation.

In addition, 3×3 may be differently applied as the filter size for each tier, in addition to 2×2.

A first tier of the convolution tier, which is a tier in a first step of receiving training data (images) having an array of 39×50, generates 32 layers of convolution images using 32 filters, and performs the activation function and the pooling calculation, whereby finally 32 layers of images having an array of 20×25 are completed.

When the above process is repeated, 64 layers of images having a size of 10×13 may be constructed in a second tier, 128 layers of images having a size of 5×7 may be constructed in a third tier, and 256 layers of images having a size of 3×4 may be constructed in a fourth tier, which is the last tier.

The images generated in the fourth tier may not be directly connected to the fully-connected tier but a separate global average polling (GAP) tier may be provided therebetween to reduce 3×4×256 images (feature information) to a size of 256, whereby it is possible to process feature information included in the filter without loss while reducing the number of calculations.

The GAP may add all values of the tiers to take the average or so as to be simply processed as the sum; however, the present invention is not limited thereto.

The result ( ) of the GAP, which is constructed as represented by the following equation, is constructed to have k one-dimensional arrays and is transmitted to fully-connected tier, where k is 256.

$$F_k = \Sigma_{x,y} f_k(x,y)$$

FIG. 6 is a view showing an embodiment in which a convolutional neural network algorithm is implemented using the PyTorch API, wherein convolution calculation through conv2d, LeakyReLU, and MaxPool2d APIs is repeatedly performed by the designated number of tiers, and Linear API for calculation in AvgPool2d and the fully-connected tier is performed with respect to the result of convolution calculation. Parameter values in each API are not limited but may be variously changed as needed within the technical level of those ordinarily skilled in the art.

The conv2d API may multiply a window type filter having a weight parameter value by input data while moving the filter at predetermined intervals and may perform calculation to obtain the total sum.

The LeakyReLU API, which is a function that sets an activation function, may be set the value of negative_slope to 0.01 such that inactivation of a negative input value to 0 is prevented and a small slope having a constant value is maintained, whereby effective learning is possible.

The MaxPool2d API, which is a function that extracts the largest value in a designated region as a representative value, constitutes a filter so as to have a size of 2×2, thereby reducing the image size by half to reduce the number of calculations in the fully-connected tier, sets a stride to 2, sets a padding to 1, and sets ceil_mode to FALSE, thereby constituting the same so as to have an integer number.

The AvgPool2d API is utilized as a means to change 256 layers of 3×4 images, which are the result of convolution calculation of the fourth tier in FIGS. 5, to 256 one-dimensional data.

The Linear API, which is a function to perform learning through weight calculation in the fully-connected tier, may set 256 input values and 4 classification result values as parameters.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF THE REFERENCE NUMERALS

11: Electrode
12: Busbar
13: Wire
14: Bonding spot
15: Battery cell
100: Defect detection apparatus
110: Bonding parameter collector
120: Data generator
130: Convolutional neural network
140: Defect determination component
200: Ultrasonic wire bonding machine
300: Bonding parameter
400: Training image data

The invention claimed is:

1. An apparatus for detecting a bonding defect occurring during an ultrasonic wire bonding process between a battery cell and a busbar connected to each other by ultrasonic wire bonding, the apparatus comprising:
    a bonding parameter collector configured to continuously collect a plurality of ultrasonic bonding parameters;
    a data generator configured to generate data by applying wavelet transform to the plurality of ultrasonic bonding parameters so as to convert the plurality of ultrasonic bonding parameters into images having a two-dimensional array;

a convolutional neural network configured to perform machine-learning training using the data generated by the data generator; and
    a defect determination component configured to determine a defect due to the ultrasonic wire bonding using the convolutional neural network that is trained,
    wherein the plurality of ultrasonic bonding parameters comprise a measured value of wire deformation, and
    wherein the measured value of the wire deformation includes a measured value of a height of a wire changed as the wire is melted.

2. The apparatus according to claim 1, wherein the plurality of ultrasonic bonding parameters comprise an ultrasonic generator current and an ultrasonic generator voltage.

3. The apparatus according to claim 1, wherein the wavelet transform is for converting the plurality of ultrasonic bonding parameters into a value of 0 to 1 through minimum-maximum scaling and generating training data having the two-dimensional array through a scale value of 2 or more using a Mexican Hat waveform transform function.

4. The apparatus according to claim 1, wherein the convolutional neural network comprises four convolution tiers, a gap tier, and a fully-connected tier.

5. The apparatus according to claim 1, wherein the ultrasonic bonding parameters are collected for a time of 10 ms to 1000 ms.

6. The apparatus according to claim 1, wherein the bonding parameter collector is configured to collect the plurality of ultrasonic bonding parameters at intervals of 0.1 ms to 100 ms.

7. A battery pack configured to have a welding defect between the battery cell and the busbar detected using the apparatus according to claim 1.

8. A device comprising the battery pack according to claim 7.

9. The apparatus according to claim 1, further comprising:
    the battery cell;
    the busbar; and
    an ultrasonic wire bonding machine coupled to the bonding parameter collector,
    wherein the ultrasonic wire bonding machine is configured to perform the ultrasonic wire bonding process on the battery cell and the busbar to have the battery cell and the busbar connected to each other by the ultrasonic wire bonding.

10. The apparatus according to claim 9,
    wherein the bonding parameter collector or the data generator is configured to sample the plurality of ultrasonic bonding parameters, and
    wherein the ultrasonic wire bonding machine is configured to provide the plurality of ultrasonic bonding parameters to the bonding parameter collector continuously in real time during the ultrasonic wire bonding process.

11. The apparatus according to claim 1, wherein the bonding parameter collector is configured to collect, continuously in real time during the ultrasonic wire bonding process, the measured value of the height of the wire as the wire is melted.

12. A method of detecting a bonding defect occurring during an ultrasonic wire bonding process between a battery cell and a busbar connected to each other by ultrasonic wire bonding, the method comprising:
    continuously collecting a plurality of ultrasonic bonding parameters;

generating a training data by converting the plurality of ultrasonic bonding parameters into images having a two-dimensional array using wavelet transform;

training a convolutional neural network with the generated training data; and determining a defect due to the ultrasonic wire bonding using the convolutional neural network, wherein the plurality of ultrasonic bonding parameters comprise a measured value of wire deformation, and wherein the measured value of the wire deformation includes a measured value of a height of a wire changed as the wire is melted.

13. The method according to claim 12, wherein the wavelet transform converts the plurality of ultrasonic bonding parameters into a value of 0 to 1 through minimum-maximum scaling and generates the training data having the two-dimensional array through a scale value of 2 or more using a Mexican Hat waveform transform function.

14. The method according to claim 12, wherein the generating of the training data comprises performing convolution calculation with respect to the images having the two-dimensional array using a 2×2 or 3×3 filter and performing calculation through an activation function and pooling to generate 256 one-dimensional data.

15. The method according to claim 12, wherein the plurality of ultrasonic bonding parameters comprise an ultrasonic generator current and an ultrasonic generator voltage.

16. The method according to claim 7, wherein the method is performed using an apparatus, wherein the apparatus comprises:
the battery cell;
the busbar;
an ultrasonic wire bonding machine; and
a bonding parameter collector coupled to the ultrasonic wire bonding machine, wherein the ultrasonic wire bonding machine performs the ultrasonic wire bonding process on the battery cell and the busbar to have the battery cell and the busbar connected to each other by the ultrasonic wire bonding, and wherein the bonding parameter collector performs continuously collecting the plurality of ultrasonic bonding parameters.

17. The method according to claim 16, wherein the apparatus further comprises a data generator, wherein the bonding parameter collector or the data generator samples the plurality of ultrasonic bonding parameters, and wherein the ultrasonic wire bonding machine provides the plurality of ultrasonic bonding parameters to the bonding parameter collector continuously in real time during the ultrasonic wire bonding process.

* * * * *